T. M. FOOTE.
RECORDING MECHANISM.
APPLICATION FILED DEC. 4, 1909.

986,159.

Patented Mar. 7, 1911.
7 SHEETS—SHEET 1.

Fig. 1

WITNESSES:

INVENTOR
Theodore M. Foote
BY
his ATTORNEYS

Fig. 2

T. M. FOOTE.
RECORDING MECHANISM.
APPLICATION FILED DEC. 4, 1909.

986,159.

Patented Mar. 7, 1911.
7 SHEETS—SHEET 5.

Fig. 7a.

WITNESSES:
F. B. Graves
Y S Andrews Jr

INVENTOR
Theodore M. Foote
BY
Chapin Hayward
ATTORNEYS

Fig. 14.

UNITED STATES PATENT OFFICE.

THEODORE M. FOOTE, OF ALLSTON, MASSACHUSETTS.

RECORDING MECHANISM.

986,159.

Specification of Letters Patent.

Patented Mar. 7, 1911.

Application filed December 4, 1909. Serial No. 531,292.

*To all whom it may concern:*

Be it known that I, THEODORE M. FOOTE, a citizen of the United States of America, and a resident of Allston, county of Suffolk, and State of Massachusetts, have invented certain new and useful Improvements in Recording Mechanism, of which the following is a specification, reference being had to the accompanying drawings, forming a part thereof.

My invention relates to improvements in recording mechanism, and particularly to a means for recording audible and visual signals upon board ship.

In U. S. Patent No. 886,788 which issued to me on May 5, 1908, a course and log recorder is disclosed in which the course taken by a ship is automatically plotted and recorded upon a moving strip of paper and upon which time and distance are also recorded at predetermined intervals, and in positions properly related to the course record.

The main object of my present invention is to also record the audible signals, such for instance, as the blowing of the whistle in fog signaling and signaling for direction, etc., and the burning of the port and starboard signal lights.

It will be readily understood that the paper strip upon which the record is made necessarily travels quite slowly so as to permit a record covering a considerable period of time to be made continuously upon a single strip of paper of reasonable length. The speed of movement may, of course, be varied, but I have found a convenient speed to be one inch in ten minutes, *i. e.* at the rate of one-tenth of an inch in a minute. In signaling for direction, etc., it often happens that a considerable number of signals are given in quick succession, and it would be impossible to delineate these signals successively by merely employing the longitudinal movement of the sheet to produce the required relative movement between the record strip and a recording element. I have, therefore, devised means for moving the recording element laterally whereby a record of considerable length may be made during a very small longitudinal movement of the sheet, and preferably for reciprocating the element laterally during a signal of considerable length, whereby a series of parallel marks will be produced whose total length represents the duration of the signal to be recorded; and I have also provided means for moving the recording element longitudinally in a direction opposite to the movement of the sheet so that in a rapid succession of the signals, or the recording of a signal or signals of considerable duration, the records will be spaced properly apart so that they will be readily legible, the recording element being arranged to have a return movement in the direction of movement of the sheet, after the record or records have been completed, or during intervals between the production of records. The audible signal records thus made are marked upon the sheet in a proper relative position with respect to records of time thereon, and preferably in proper relative position with respect to a course and distance record so that the complete record shows not only the signals given, but also the direction in which the ship is pointing at the time, its position in the course, and the time of day or night.

The means for recording the burning of the lights is designed to make a continuous mark upon the record strip for either or both of the port and starboard lights for all the time they are burning. This record, taken in connection with the time record upon the sheet will properly indicate the exact time at which these lights start to burn, the entire time during which they actually do burn, and the moment at which they cease to burn. This means is automatically controlled by means of the lights themselves, preferably by a thermostat acted upon by the heat of the lights, which, through proper relay mechanism, directly operates the recording devices. Thus, should electric lights be employed, and one of the lights go out by reason of a short circuit, the failure of the light would immediately affect the recording mechanism to cause it to so indicate.

In carrying out my invention, I employ many novel details of construction and combinations of parts, such as will be fully pointed out hereinafter, and in order that my invention may be thoroughly understood, I will now proceed to describe an embodiment thereof, having reference to the accompanying drawings illustrating the same, and will then point out the novel features in claims.

In the drawings: Fig. 7ª is an enlarged detail view of the parts shown in Fig. 7, the recording finger being shown as in an intermediate position while returning to its normal rest position.

In general, the machine illustrated corresponds to that shown in U. S. Letters Patent No. 886,788, and for a complete understanding of the entire machine, reference is made to the disclosure in that patent. For the present specification, it is sufficient to state that the machine, in general, includes a means for causing a record strip 20 to travel longitudinally in the machine at a predetermined rate of speed, a course recording element 21 by which the compass course of the vessel is recorded thereon, a time recording element 22 by which a record of time is printed upon the sheet, and a counter 23 by which a record is kept of the number of revolutions of the engine shaft, or the number of revolutions of a trailing "patent" log, from which distance may be computed. The counter 23 is similar to the counter shown in the above patent, but in the present instance, I have shown a second counter 24 whereby the revolutions, both of the engine shaft and of the trailing log may be kept.

Figure 1:
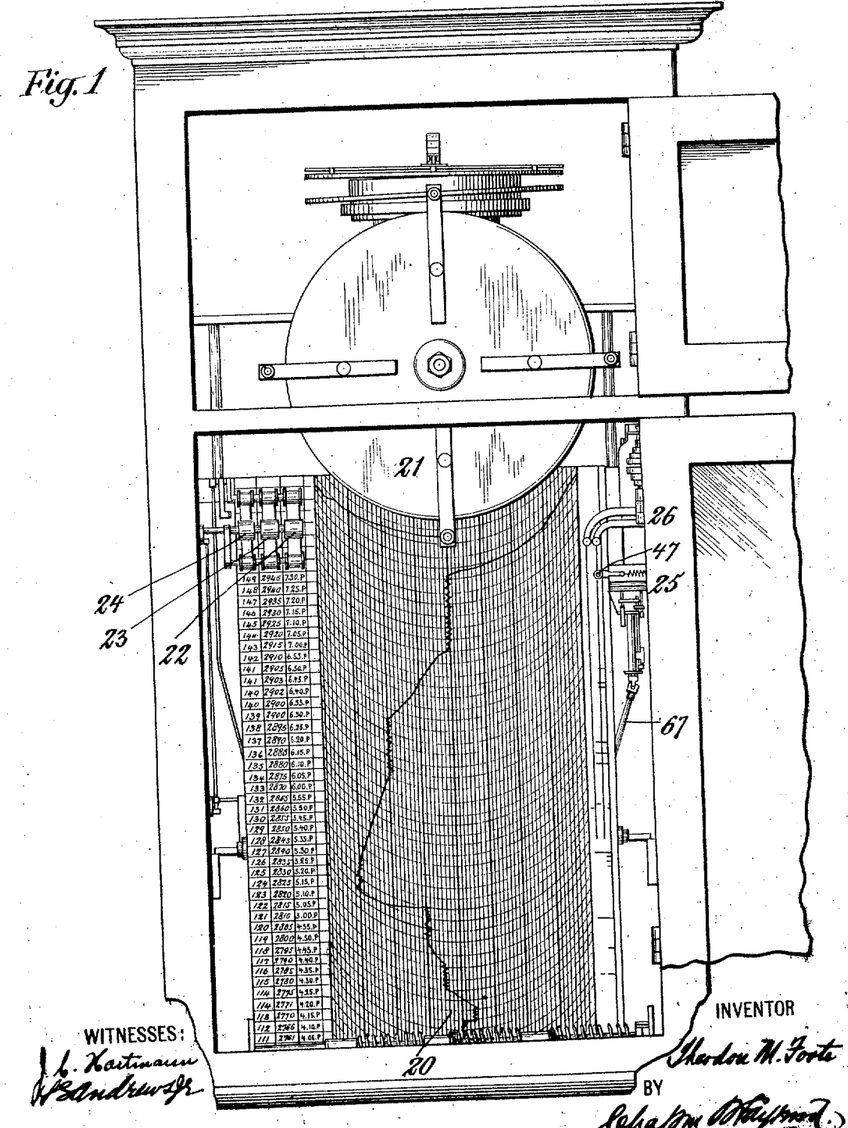
Figure 1 is on view of a complete course and log recorder, having my improved signal recording mechanism connected thereto.
Figure 2:
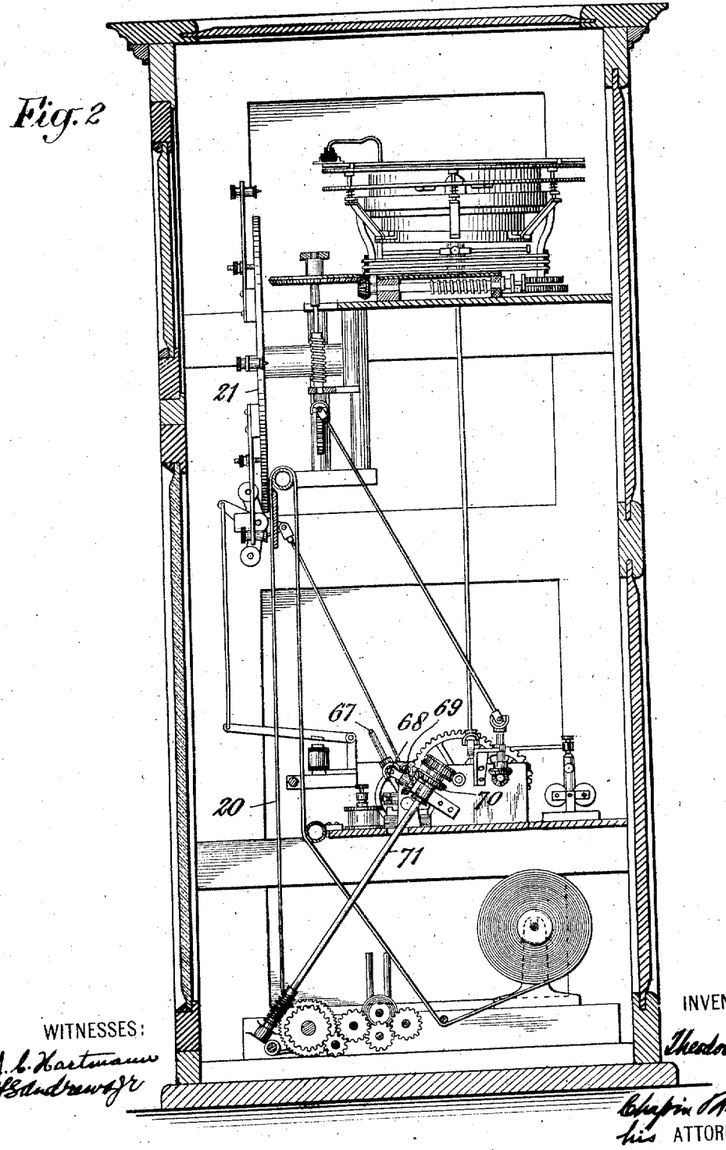
Fig. 2 is a view in side elevation of the entire mechanism with the casing in vertical longitudinal section.

The foregoing time and distance records are printed upon the left hand side of the record strip, as is shown in Fig. 1. I have arranged the audible signal recording mechanism 25 and the visual signal recording mechanism 26 at the opposite side of the machine so that the records made thereby will appear upon the opposite edge of the strip as is shown in Fig. 1.

Figures 3, 4, 5, 7, 8:
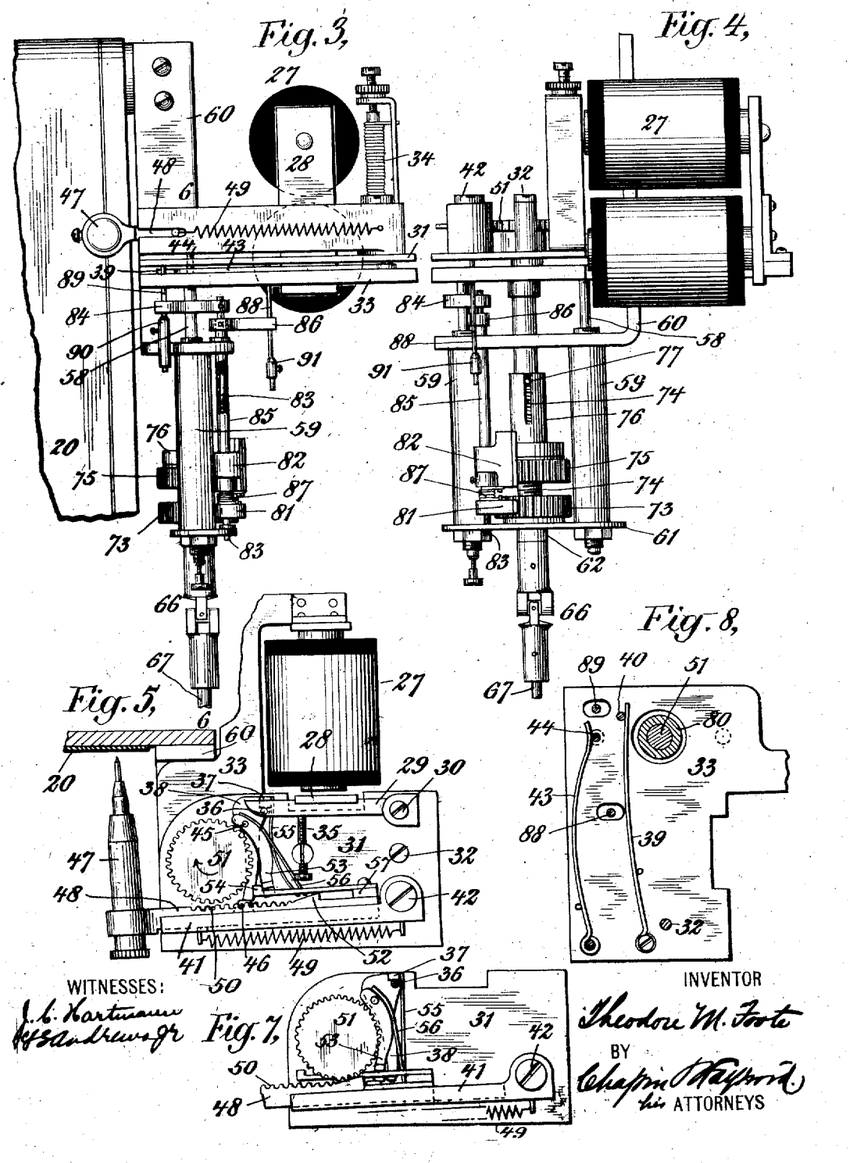
Fig. 3 is a detail front view upon an enlarged scale of the audible signal recording means.
Fig. 4 is a view in side elevation of the same.
Fig. 5 is a top view of the same.
Fig. 7 is a detail view in horizontal section therethrough, showing particularly the engagement of the locking dog with the recording finger by which the recording finger is held in its normal "out of operation" position.
Figs. 8, 9, and 10 are detail views in horizontal section therethrough upon successively lower planes, showing the operating mechanism for longitudinally moving the recording finger with respect to the traveling sheet.

The audible signal recording means comprises an electro-magnet 27 arranged to be energized at the sounding of each audible signal, and to remain energized during the time the said signal is sounding, and an armature 28 arranged to be attracted thereby, the said armature being arranged upon an armature lever 29 pivoted at 30 upon a plate 31 which is in turn pivoted upon a stud 32 affixed to a frame piece 33. The armature lever 31 is arranged to have a limited movement with respect to the plate 31, against the tension of a light coil spring 34, a stop 35 limiting the movement thereof under the influence of the spring, while in the other direction the movement is limited by means of a dependent pin 36 which comes into engagement with an abutment 37 upon a dog 38 carried by the said plate 31. The plate 31 as a whole, has a limited movement toward and away from the electro-magnet 27 against the influence of a leaf spring 39 which is disposed between the lower face of the plate 31, and the upper face of the frame piece 33, as is shown in Fig. 8, the leaf spring being secured at one end fast to the frame piece and at the other bearing against a pin 40 dependent from the plate 31. The leaf spring 39 is considerably stronger than the coil spring 34 so that when the armature is first attracted, the armature lever 29 will move to the limit of its movement with respect to the plate 31, and thereafter the said lever and plate 31 will move together toward the said magnet.

Mounted upon the plate 31 is a guide piece 41, the same being pivoted upon a stud 42 secured to the said plate 31. The said guide piece is pressed forward by means of a leaf spring 43 which is disposed between the lower face of the plate 31 and the upper face of the frame piece 33, one end of the leaf spring being secured to the frame piece, and the other end arranged to operate against a pin 44 which projects downwardly from the guide piece 41 through the plate 31 to a point adjacent to the said spring 43. Normally the guide piece 41 is prevented from moving forward upon the frame piece 31 by reason of the engagement between it and the forward end of the aforesaid dog 37. The dog 37 is pivotally mounted at 45 upon the plate 31, and the end thereof opposite to the end which carries the abutment 37 engages a projecting portion 46 upon the lower part of the said guide piece 41.

The recording element is supported by the guide-piece, the same comprising a finger 47, and a supporting bar 48 mounted to slide longitudinally in guideways in the said guide piece 41. A helical spring 49 is secured at one end to the said guide piece and at the other end to the said bar 48, the spring acting to normally draw the said recording element to its normal retracted position in which it is shown in Fig. 5 of the drawings. The front face of the bar 48 is serrated to form teeth 50 which are adapted for engagement with the teeth of an operating pinion 51. When the guide piece 41 is being held in its normal "out of operation" position by the dog 38, the teeth 50 of the bar 48 are out of engagement with the teeth of the pinion 51, but when the electromagnet 27 operates to retract the armature 28 toward it, and the pin 36 upon the armature lever engages the abutment 37 of the dog 38, the said dog will be rocked upon its pivotal support to a degree sufficient to cause the opposite end thereof to be disengaged from the projection 46 of the guide piece 41 and the said guide piece will be moved forward under the influence of its spring 43 to cause the teeth 50 of the rack bar to engage the teeth of the pinion 51. When the guide piece thus moves forward, the finger 47 will also be moved forward toward the record strip, and this movement coupled with the further movement thereof due to the movement of the entire plate 31 under the influence of the electromagnet 27, will be sufficient to cause the tip thereof to engage the traveling record strip 20, as will be well understood by reference to Fig. 5 of the drawings, whereby a record mark will be commenced upon the sheet. The pinion 51 is driven constantly in the direction of the arrow in Fig. 5 so that directly the parts are in a position to make a record mark, the recording element will be moved to the left as viewed in Fig. 5. It will so move to the left until the end of the teeth 50 is reached. At such point a projection 52 upon the bar 48 will be engaged by the wheel 51, as shown in Fig. 7 and the bar and guide piece will be together forced outward against the tension of the spring 43 whereby the recording finger will be lifted away from the recording strip, and the recording element will be free to return to its normal position. Directly the teeth of the bar 48 are released from engagement with the teeth of the wheel 51, the spring 49 will operate to retract the recording element quickly to its normal position with respect to the guide piece 41; and in order to prevent the reëngagement of the teeth during this retractile movement, I have provided a second dog 53 which is arranged to engage the projection 46 of the guide piece 41 at such time. This dog 53 is normally in the inoperative position in which it is shown in Fig. 5, and it is moved into this inoperative position at the extremity of the retractile movement of the bar 48 by means of an abutment 54 which is carried by the bar 48, and which engages a projection upon the dog 53 just at the moment the bar 48 completes its rearward movement. If the electromagnet 27 is still energized when the bar 48 completes its rearward movement, the disengagement of the second dog 53 will release the guide piece 41 to permit it to again come forward to cause the teeth of the bar 48 to engage the teeth of the pinion 51, and the said recording finger to be once more moved over to the left by the operation of the pinion 51. It will thus be seen that for so long a time as the magnet 27 is energized, successive lateral reciprocating movements will be given to the recording element.

In Fig. 7 the recording element bar 48 is shown as in the act of returning to its normal position with respect to the guide piece 41 under the influence of the spring 49, and the dogs 38 and 53 are in such positions that they both engage the projection 46 upon the guide piece 41 to hold the guide piece in such a position as to maintain the rack teeth 50 of the bar 48 out of engagement with the teeth of the pinion 51, and the finger of the recording element away from the record strip 20, to permit of such return movement. During the time the recording element is moving to the left, the same will be in engagement with the recording strip, while in the rearward movement, it will be out of contact therewith, because the movement of the plate 31 is not sufficient to bring the recording finger in engagement with the plate except when such movement is augmented by the movement of the guide piece 41 and bar 48 thereof to bring the teeth of the bar into engagement with the teeth of the pinion 51,—just as the movement of the guide piece 41, to cause the engagement of the teeth 50 thereof with the teeth of the pinion 51, is not sufficient to cause the engagement of the recording finger with the record strip, except when the plate 31 is in its position toward the magnet. Directly the magnet 27 is deënergized the dog 38 will be freed, so that when the guide piece 41 is forced outward at the end of a movement to the left of the recording element, (by the engagement of the projection 52 with the wheel 51), it will engage the projection 46 upon the guide piece and hold the guide piece and recording element in its "out of operation" position at the completion of the return movement of the recording element in the guide piece, and after the disengagement of the second dog 53 therewith by the operation of the abutment 54. The second dog 53 operates to hold the guide piece in such a position as to prevent reëngagement of the teeth of the bar 48 with the teeth of the pinion 51 during the return movement of the bar along the guide piece only. At all other times the position of the guide piece is controlled by the position of the dog 38, which is in turn controlled in its position by the magnet 27.

In Fig. 5 both of the dogs are shown in their normal rest position, the magnet 27 being deënergized. The dog 38 engages the projection 46 while the dog 53 is held away therefrom by the abutment 54.

Figure 7A:
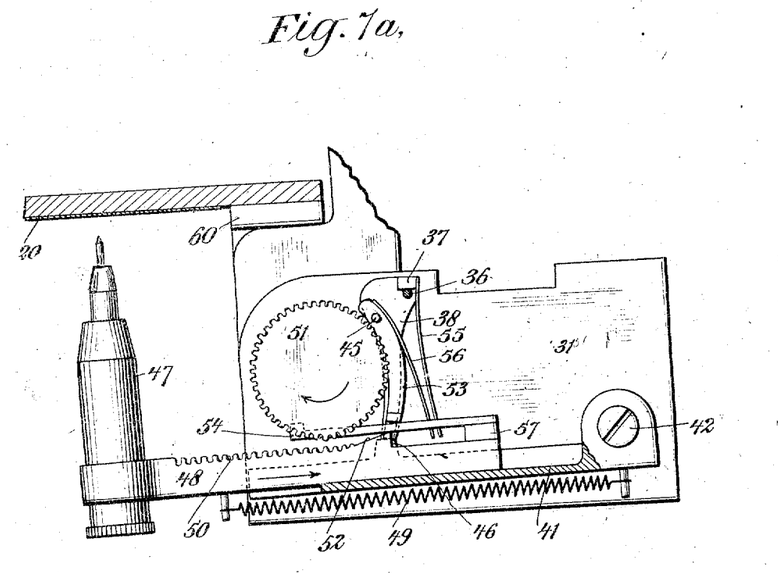

In Fig. 7 the electro-magnet 27 having been energized the dog 38 is away from its engagement with the projection 48, but as the dog 53 is free from engagement with the abutment 54 and the bar 48 has reached the limit of its outward movement, i. e., its movement to the left as viewed in Figs. 5, 7, and 7ª, the dog 53 is in engagement with such projection.

In Fig. 7ª both of the dogs are in engagement with the projection, the dog 38 because the electro-magnet has been deënergized and the dog 53 because the bar 48 has not yet completed its travel to the right wherein the engagement of the abutment 54 with the dog 53 will release it from its engagement with the said projection 46.

I have provided the two dogs 38 and 53 with light leaf springs 55 and 56. These springs are not normally under tension because there is no necessity that they should be, there being no tendency to move the dogs during the time the parts are in their rest positions. At the end of the forward movement of the recording element in the guide piece, the ends of the springs are, however, engaged by a downward projecting portion 57 which moves with the said bar 48, so as that the springs will be placed under tension just at the end of the movement of the said bar 48. If the dog 37 is free from engagement with the pin 36 upon the armature lever 29 at such time, due to a deënergized condition of the electro-magnet 27, the action of the spring 55 will be such as to force the dog 38 into a position to engage the projection 46, otherwise, the spring being very light, the spring only will be deflected, that is to say, the tension of the spring 55 is in no wise sufficient to force the armature away from the electro-magnet 27 when the same is energized. The tension under which the spring 56 is placed, will cause the second dog 53 to be similarly thrown over to a position to engage the projection 46 of the guide piece 41, so as to hold the guide piece during the return movement of the recording element as has been above described, but during the said return movement, the spring 56 being clear of engagement with the part 57, there will be no opposition to the return movement of the dog 53 under the influence of the abutment 54 and no tendency to move the dog over to its opposite position until the spring is again placed under tension near the end of the outer movement of the guide piece 41. It will be understood that during the said lateral reciprocating movements of the recording element, the record strip will be slowly traveling longitudinally, i. e., at substantially right angles to such movements of reciprocation, but as this movement is an exceedingly slow one, the marks made by the record point would be substantially superposed one upon the other, unless some means were provided to prevent it. I have overcome this difficulty in the present case by providing means for moving the recording element bodily in a direction opposite to the longitudinal feeding movement of the strip, during recording movements thereof, the said recording element being arranged to move in the opposite direction, i, e., in the same direction as the strip after such recording movements and until it has returned to a normal position. For this purpose the frame piece 33 instead of being stationary, is provided with longitudinal guide stems 58 which are mounted and guided in vertical guide tubes 59 secured to, and forming a part of, a bracket 60, whereby the frame piece 33 and parts carried thereby may be moved with respect to the part supporting them. At their lower ends, the said guide tubes 59 are mounted in a cross head 61, by which they are secured rigidly together and are maintained in parallel relation.

The cross head 61 is provided centrally with a hub 62 which constitutes a bearing for a spindle 63, the upper end of which is maintained in driving relation with the hub 64 of the pinion 51 by means of a pin 65 which is transversely mounted in the upper end of the said spindle and is received in a slotted portion of the said hub 64. The lower end of the spindle is secured to a universal joint 66 which is in turn secured to an oblique shaft 67. The lower end of the oblique shaft 67 is connected through a universal joint connection 68 with a stub shaft upon which is arranged a bevel gear 69 whose teeth are disposed in mesh with the teeth of a bevel gear 70 upon a shaft 71 which continuously rotates in the operation of the machine. This shaft 71 is the shaft by which driving movements are transmitted to the means for feeding the record strip longitudinally, so that the oblique shaft 67 is driven at a predetermined relative speed with respect to the speed at which the record strip travels. A sleeve 72 surrounds the spindle 63 near the lower end thereof, being secured fast thereto so that it will rotate therewith; and upon this sleeve is loosely mounted a ratchet wheel 73 having an elongated screw-threaded hub 74 uprising therefrom. An internally screw-threaded ratchet wheel 75 is fitted to the said hub 74, forming a nut thereon. Above the said wheel 75 and resting thereon is a sleeve 76, the lower portion of which freely surrounds the upper end of the sleeve 74, and the upper portion of which is slotted to receive a pin 77 which is transversely secured to the spindle 63 whereby the said sleeve and spindle are maintained in driving relation with each other. A thimble 78 surrounds the lower portion of the hub 64 and extends between the upper face of the sleeve 76 and the lower face of a collar 79 which is secured fast upon the sleeve 68 just beneath the bearing hub 80 for the sleeve 64 in the plate 31.

In the operation of the parts so far described rotational movements imparted to the spindle 63 will be transmitted thereby to the sleeve 76 and to the hub 64 of the wheel 51. Moreover, the frictional engagement of the rotated parts with the wheels 73 and 75 will tend to cause the said wheels to be rotated therewith. Two pawls 81—82 are, however, provided for engagement with said ratchet wheels, whereby the one or the other thereof may be held stationary while the other is permitted to revolve. The pawl 81 is mounted upon a central spindle 83, the upper end of which has secured thereto an arm 84, while the pawl 82 is mounted fast upon a sleeve 85, the upper end of which has secured thereto an arm 86. The spindle 83 passes through the sleeve 85 whereby the two said parts form mutual bearings for each other. The sleeve 85 near its upper end has a bearing in the horizontal portion of the bracket 60, while the spindle 83 has a bearing at its lower end in the cross-head 61. A coil spring 87 between the said pawls 81 and 82 exerts a tendency to normally force the pawl 82 toward the ratchet wheel 75, and the pawl 81 away from the ratchet wheel 73. In the normal inactive position of the parts the pawl 82 is, however, forced away from the ratchet wheel 75; this is accomplished by means of an element 88 carried by the plate 31 which engages the arm 86 in such a way as to slightly rotate the sleeve 85 and so to move the pawl 82 away from the teeth of the ratchet wheel 75. A second element 89 is carried by the plate 31 for engagement with the arm 84 which moves with the pawl 81, as will be well understood by reference to the drawings. In the normal rest position of the parts, as just stated, the element 89 is so constructed and arranged as to be out of engagement with the arm 84 so that the arm may move forward under the influence of the spring 87, to permit the pawl 81 to be out of engagement with the teeth of the ratchet wheel 73. Thus, under normal conditions, both of the pawls 81 and 82 are out of contact with the teeth of the ratchet wheels 73 and 75, and the ratchet wheels rotate together with the other parts, through the frictional engagement therewith as above stated.

When the parts are operated to make a record the movement of the plate 31 toward the electro-magnet 27, which, it will be remembered, occurs at such time, causes the elements 88 and 89 to be moved away from the arms 84—86. The arm 84 will follow the movement of the element 89 under the influence of the spring 87, with the result that the pawl 81 will merely be moved a little farther away from the teeth of the ratchet wheel 73, but as the arm 86 attempts to follow the element 88 the pawl 82 will drop into engagement with the teeth of the ratchet wheel 75 and will hold the said ratchet wheel against rotation. As the wheel 73 carrying the threaded sleeve will now be revolved in the further rotational movement of the parts, while the sleeve 75 constituting the nut thereon will now be held stationary, it will follow that the nut will be gradually wound up or elevated upon the sleeve. This movement of elevation will be transmitted from the nut 75 through the sleeve 76 and the thimble 78 to the plate 31, and as the said plate 31 is carried by the frame piece 33 such movement will be imparted to the frame piece and all the parts carried thereby; this elevational movement will continue for so long a time as the signal is being recorded. Directly the record has been completed the deënergization of the electro-magnet will cause the plate 31 to move back to its normal position, the said plate carrying with it the elements 88—89, whereby first, the said pawl 82 will be lifted out of engagement with the ratchet wheel 75, and second, the pawl 81 will be forced into engagement with the ratchet wheel 73. This latter will be effected because of the fact that the plate 31, in its upward movement, carrying with it the elements 88—89, has brought an offset portion 90 of the element 89 into a position to engage the arm 84 upon the return movement of the plate, and the arm 84 will have been so engaged in such return movement of the plate and the spindle 83 thereby partially rotated sufficiently to force the pawl 81 into engagement with the teeth of the ratchet 73. In the continued rotational movement of the operating shaft 67,—it being remembered that this shaft rotates all the time whether signals are being imparted or not because it is in direct gear with the main operating parts of the machine,—movements of rotation will now be transmitted thereby to the wheel 75 while the wheel 73 will be held stationary. This will cause the nut 75 to be unwound upon the threaded sleeve 74 of the wheel 73, whereby to gradually lower the nut 75 and the parts supported thereby to its normal position. The speed at which this nut moves downward is designed to be about equal to the speed of movement of the traveling record sheet whereby the return movement of the recording element, which, it will be remembered moves downward with the downward movement of the nut 75,—will synchronize with the movement of the recording sheet. Directly the wheel 75 reaches its lowermost position, the offset portion 90 of the element 89 will have reached a position below the arm 84 so that the arm 84 will be again permitted to move forward to release the pawl 82 from the teeth of the wheel 75 whereby the two wheels 73—75 may once more rotate with the shaft 67, and the recording element will remain in its normal rest position.

The element 88 is provided with an offset portion 91 by which the arm 86 is arranged to be engaged should an excessive upward movement be imparted to the recording element, the same constituting means for preventing overthrow movements of the parts, but it will be understood that the parts are intended to be so designed as to make ample provision for all the movements required before the limit of movement causing the abutment 91 to act, would be reached.

In general, the operation may be summarized as follows: Under normal conditions, the record strip is traveling slowly downward under the influence of the continuously operating feeding mechanism, and the pinion 45 being connected through the spindle 63 and oblique shaft 67 with such operating mechanism, is continuously rotating in the direction of the arrow in Fig. 5. The guide piece 41 is held in a position wherein the rack teeth of the bar 48 are out of engagement with the teeth of the pinion 51 by the dog 38. Directly a signal is sounded, the electro-magnet 27 is energized and the armature 28 is attracted thereto. The initial movement of the armature rocks the dog 38 upon its pivot 45 and causes its disengagement from the abutment 46 upon the bar 48 thereby permitting the bar 48 and guide piece 41 to move forward under the influence of the spring 43. Directly the armature 28 reaches the limit of its movement with respect to the plate 31, it then carries the plate 31 forward with it against the influence of the spring 39 so that as the recording element is engaged by the pinion 51, the tip thereof will be in engagement with the face of the record strip 20. The recording element will be moved to the left by the operation of the pinion 51 and a transverse mark will be made upon the record strip by the recording element. The electro-magnet 27 will remain energized for so long a time as the signal is being given, but directly the signal ceases, the electro-magnet will be deënergized whereby the armature 28 will be released and the plate 31 will be permitted to move back to its initial position by the spring 39. If the recording element has not yet reached the limit of its movement under the influence of the pinion, its movement to the left will continue, but the tip being out of contact with the record strip, no mark will be made thereby. At the end of its stroke, the abutment 52 upon the bar 48 will be engaged by the pinion 51 and the recording element and guide piece 41 will be forced backward against the pressure of the spring 43, and the parts will be held in such position by the reëngagement of the dog with the abutment 46 of the bar 48. Directly the guide piece reached the position wherein the teeth of the bar 48 were clear of the teeth of the pinion 51, the recording element was free to return to its normal position along the guide piece 41 and such movement will take place under the influence of the spring 49. It will also be remembered from the foregoing description that when a signal is being operated at the moment the recording element reaches the limit of its movement to the left and hence the recording element returns while the electro-magnet 27 is still energized, that the dog 38 does not operate, but that the second dog 53 operates in lieu thereof to hold the guide piece in its rearward position during and only during the return movement of the recording element along the guide piece, and that immediately thereafter, the guide piece is allowed to move forward to cause the reëngagement of the rack teeth with the teeth of the pinion whereby the recording element is again moved to the left.

Figure 13:
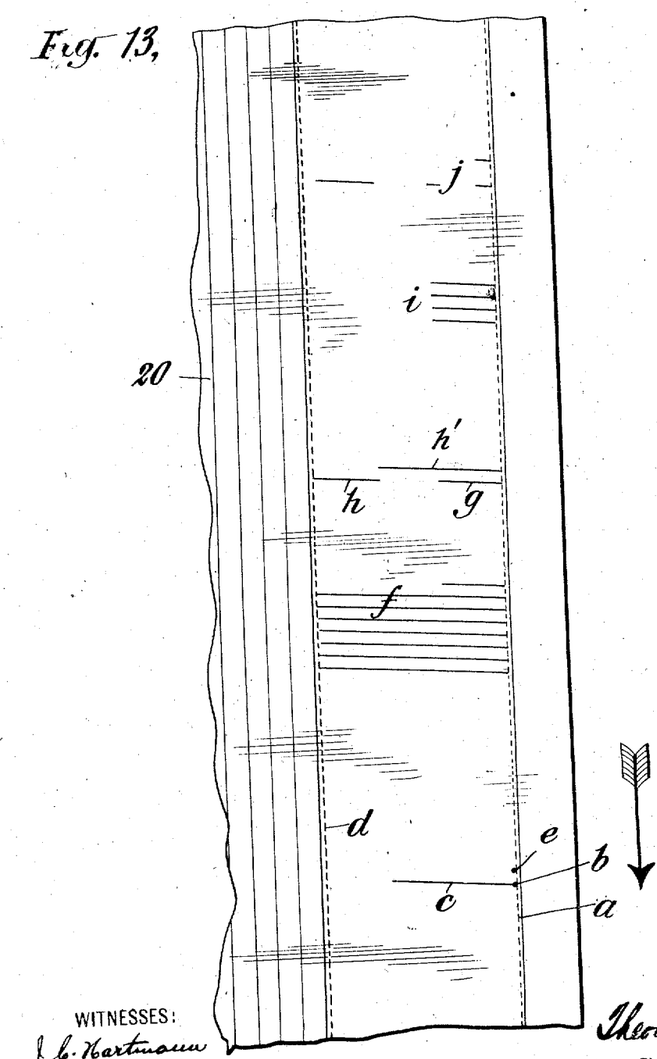
Fig. 13 is a diagrammatic view illustrating the various and relative movements between the recording finger and the traveling strip in the production of different signal records.

In order to facilitate the understanding of the relative movement of the recording element with respect to the traveling record sheet, I have prepared a diagram, Fig. 13, showing a portion of a record strip upon which a number of recording marks appear. This strip travels in the direction of the arrow at a speed of, say, one-tenth of an inch per minute. While the sheet is so traveling the point of the recording element is normally opposite a marginal line "$a$" thereon. At the instant the signal is sounded the recording element goes forward and touches the recording strip, at say "$b$," and as the recording element is immediately caused to move over to the left a lateral mark "$c$" will be made upon the sheet. This lateral mark will be slightly oblique to the horizontal because of the fact, first, that the traveling record sheet is moving in the direction of the arrow, and second, the recording element is being moved bodily in the opposite direction by the means just stated. The length of the mark "$c$" will be proportionate to the length of time the signal is being sounded. Assuming that the element can move laterally the entire distance permitted (which distance is indicated by the dotted line "$d$") during fifteen seconds, then the line "$c$" will be two-thirds of this distance if the signal be sounded for ten seconds. Immediately the signal has ceased to sound the recording element will move away from the sheet so as to make no further mark thereon, but the recording element will continue to move over until it reaches a point coincident with the line "d,"—that is to say, completes its lateral movement, and will then snap back under the influence of its spring 49, to a position along the line "a." This position is noted at "e" upon the diagram. If no further signal be given the recording element will then move down synchronously with the strip until it has moved back to its normal position, after which the strip will continue to move while the recording point will remain stationary.

I have shown a series of lines "f" which would indicate that a signal had been sounded for one minute and fifty seconds,—that is to say, seven parallel lines are shown the complete distance between the lines "a" and "d" and a further line having a length one-third of the distance. Of course such a signal is an extremely unusual one and under ordinary circumstances it would never be given. It is my intention to make the distance between the lines "a" and "d" and the speed of lateral movement of the recording element such that a complete signal will ordinarily be represented by a line shorter than the distance between "a" and "d."

Above the lines "f" I have shown lines g, h, and h¹ which would represent respectively a signal of five minutes duration, and then another signal of fifteen seconds duration after an interval of five seconds. In this case the recording of the second signal has commenced before the recording element has completed its lateral movement and returned to its initial position. Above this point I have shown several lines of varying lengths and with varying distances between them, the same constituting a characteristic record under ordinary circumstances,—for instance, the record "i" is a series of blasts of five seconds duration with equal intervals between them, while the record "j" indicates two short and one long signal blast followed after a short interval by a single short blast. When it is remembered that during all the time these signal blasts are being recorded, units of time are being recorded by the time recorder 22 upon the opposite side of the sheet, units of distance are being recorded by the counters 23 and 24, and the compass position of the vessel is being recorded by the record element 21,—it will then be appreciated that not only is a complete record being kept of the signals given but of the relation of these signals to time, place, and direction of the vessel.

Figures 6, 9, 10, 11, 12:
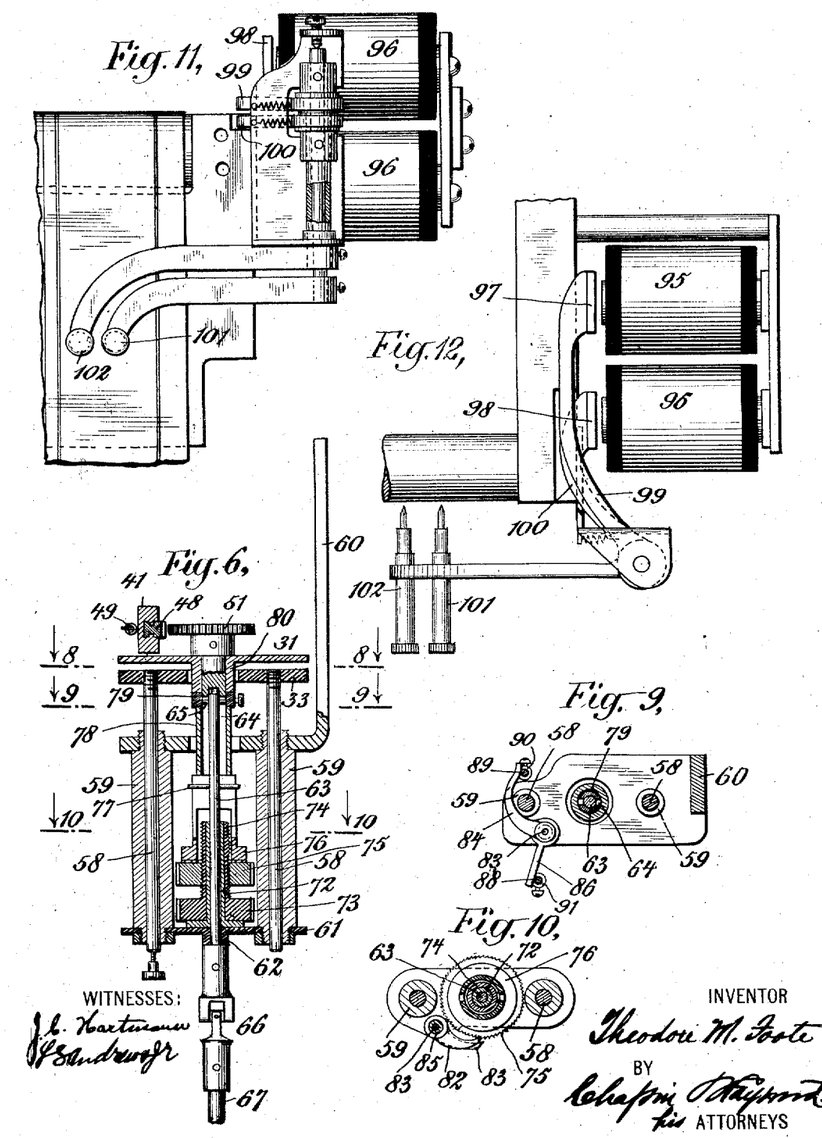
Fig. 6 is a view in vertical transverse section through the same, the plane of section being taken substantially upon the line 6—6 of Fig. 3.
Fig. 11 is a face view of the visual signal recording means.
Fig. 12 is a top view of the same.

The means for recording the visual signals, i, e., the port and starboard lights,—comprises two electro-magnets 95—96, armatures 97—98 therefor, bell crank levers 99—100 to which said armatures are secured, and recording elements 101—102 also carried by the said bell crank levers. The electro-magnets are arranged to be controlled through thermostatic circuit controllers 103—104 whereby the said electro-magnets will be energized while the lights are burning. The effect of this will be to attract the armatures 97—98 and to cause the recording elements 101—102 to engage the record strip so as to make a continuous mark thereon for the entire time the lights are burning. Directly the lights are extinguished, the electro-magnets will be deënergized, the armature retracted by suitable springs provided for that purpose, and the recording elements moved out of contact with the recording sheet.

By the employment of thermostatic circuit controllers 103—104 I am in no way dependent upon the electric light power circuit for the control of the electro-magnets 95, 96. By this means I not only obtain a sure record as to whether the lights are burning or not, but the device is equally adapted for use where lights other than electric lights are employed.

Figure 14:
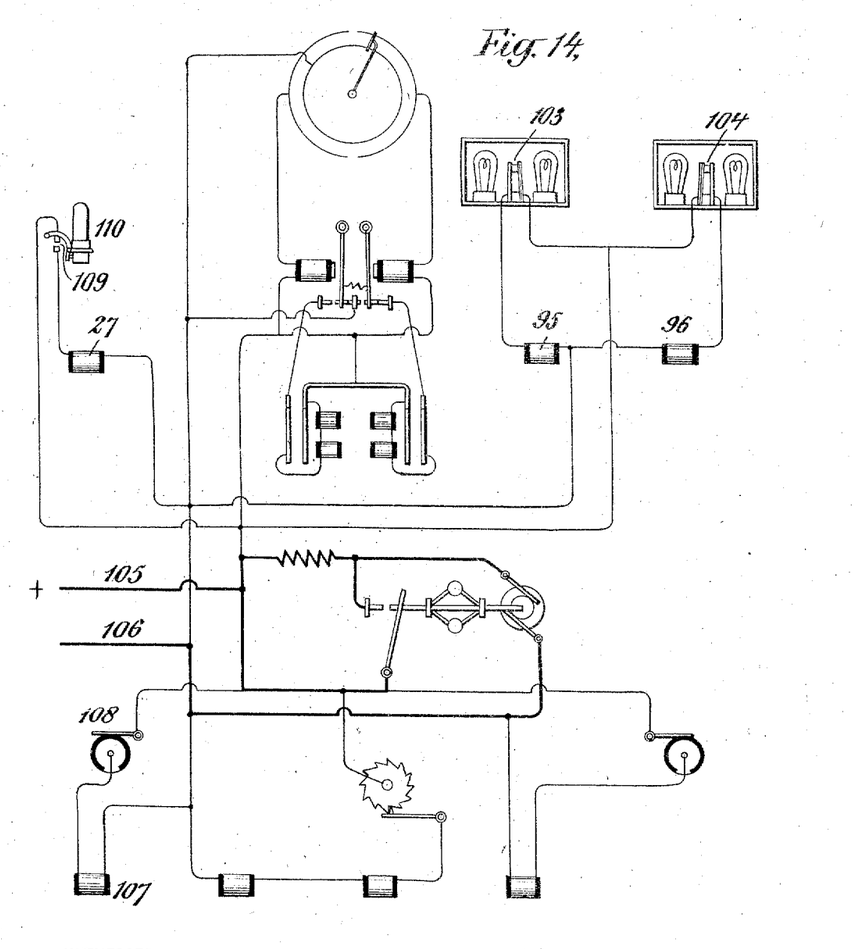
Fig. 14 is a diagrammatic view illustrating conventionally, the principal electric circuits of the machine.

In Fig. 14 I have shown diagrammatically the electric circuits for the machine, and in this figure I have followed closely the diagram in the Patent No. 886,788 above noted, merely adding the additional circuits for the new appliances of the present application. In this diagram the main feed wires are shown at 105—106. An electro-magnet 107 is shown as in circuit therewith through a circuit closer 108. The electro-magnet 107 is intended for operating the second of the two counters 23—24, the circuit closing device 108 representing a circuit closer therefor operated either by the trailing log or the engine shaft, or some other moving part of the machinery. The electro-magnet 27 is shown as in circuit with the main feed wires through a circuit closer 109 operated in connection with the controlling means for the signal whistle 110. The electro-magnets 95 and 96 are similarly shown in circuit with the main feed wires through their respective thermostatic controllers 103—104.

While I have illustrated and described herein the visual signal recording means because of the fact that the same forms a part of the complete recording mechanism, this feature is not claimed herein but forms the subject matter of a separate copending application filed as a divisional of the present case upon May 2, 1910, in accordance with an official requirement, and being serially numbered 558,779.

What I claim is:

1. Signal recording mechanism comprising means for feeding a record strip in one direction, a recording element therefor, means for feeding the recording element across the record strip transverse with respect to its feeding movement, and means for moving the recording element carrier toward the face of the record sheet during the continuance of the signals of varying durations, and for moving it away at the termination of each such signal, whereby the recording element will make a mark upon the record strip whose length will represent the duration of a signal.

2. Signal recording mechanism comprising means for feeding a record strip in one direction, a recording element, a carrier therefor, means for imparting a predetermined and uniform degree of feeding movement to the recording element across the face of the record strip transverse with respect to its feeding movement, and means for moving the recording element carrier toward the face of the record strip during the continuance of a signal, whereby a mark will be made by the recording element upon the face of the said strip during that portion of its transverse movement corresponding to the duration of the signal, so that the length of the said mark will represent the said signal duration.

3. Signal recording mechanism comprising means for feeding a record strip in one direction, a recording element, means normally inactive, for imparting a predetermined extent of movement to the recording element across the face of the record strip transverse with respect to its feeding movement, means for starting the operation of the said recording element feeding means upon the commencement of the operation of a signal, means for simultaneously moving the recording element toward the record strip and for retaining it in its said position during the continuance of any signal whose duration is not greater than the length of time it takes the recording element to complete one transverse feeding movement, and for causing the recording element to move away from the face of the record strip during the completion of any one such transverse feeding movement after a signal of less duration than the full extent of such feeding movement has ceased, whereby the said recording element will make a mark upon the record strip whose length will represent the duration of the signal, and will continue to travel in the same direction to complete the full extent of its feeding movement without extending the said mark.

4. Signal recording mechanism comprising means for continuously feeding a record strip in one direction, a recording element, means for imparting a succession of feeding movements in one direction to the said recording element during the feeding movement of the record strip, and transverse with respect to the direction of movement of the said record strip, the said feeding movements of the recording element alternating with rapid return movements thereof, and means for causing the recording element to successively engage the record strip in its successive movements, during the continuation of a signal whose duration is greater than the time it takes for the recording element to complete a single feeding and return movement, whereby a plurality of transverse marks will be made upon the record strip, the total length of which will represent the total duration of the said signal.

5. Signal recording mechanism comprising means for continuously feeding a record strip in one direction, a recording element, means for imparting a succession of reciprocating feeding movements to the recording element during the feeding movement of the record strip, and transverse with respect to the direction of such movement, and means for causing the recording element in its successive movements in one direction to engage the record strip during the continuance of a signal, whereby a plurality of parallel transverse marks will be made upon the sheet, whose total length represents the total duration of the signal.

6. Signal recording mechanism comprising means for feeding a record strip in one direction, a recording element, means controlled by the operation of the signal for feeding the recording element in a direction opposite to the direction of the feeding movement of the strip, during the continuance of a signal, and means for thereafter moving the recording element in a direction with the movement of the record strip, but at a speed not greater than the speed of such movement, to return the recording element to a normal position, after the completion of a recording operation.

7. Signal recording mechanism comprising means for feeding a record strip in one direction, a recording element, means controlled by the operation of a signal for feeding the recording element transversely across the face of the strip and also for feeding the same simultaneously in a direction opposite to the direction of the feeding movement of the strip.

8. Signal recording mechanism comprising means for feeding a record strip in one direction, a recording element, means controlled by the operation of a signal for feeding the recording element transversely across the face of the strip, and also for simultaneously feeding the same in a direction opposite to the direction of the feeding movement of the strip, during the continuance of a signal, and means for thereafter moving the recording element in a direction with the movement of the record strip, but at a speed not greater than the speed of such movement, to return the recording element to a normal position, after the completion of a recording operation.

9. The combination with signal operating means, of signal recording mechanism comprising means for feeding a record strip in one direction, a recording element held normally away from the face of the record sheet, and means controlled by the operation of the signal for feeding the recording element across the record strip transverse with respect to its feeding movement.

10. The combination with signal operating means, of signal recording mechanism comprising means for feeding a record strip in one direction, a recording element, means controlled by the operation of the signal for imparting a feeding movement of predetermined extent to the recording element, transverse with respect to the feeding movement of the sheet, and means operated during the continuance of the signal for causing the recording element to engage the face of the record strip.

11. The combination with signal operating means, of signal recording mechanism comprising means for continuously feeding a record strip in one direction, a recording element, means controlled by the operation of a signal for imparting a succession of reciprocating feeding movements to the recording element during the feeding movement of the record strip, and transverse with respect to the direction of such movement, and means for causing the recording element to engage the record strip during the continuance of such signal whereby a plurality of parallel transverse marks will be made upon the sheet whose total length will represent the total duration of the signal.

12. Signal recording mechanism comprising a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, and means for returning the guide piece to its normal position, thereby causing the disengagement of the recording element from the rotating member, after the recording element has been moved a predetermined distance.

13. Signal recording mechanism comprising a recording element provided with rack teeth, a movable guide piece for supporting the recording element, a continuously rotating pinion, means for normally holding the guide piece in a position to prevent the engagement of the rack teeth of the recording element with the teeth of the pinion, means for moving the guide piece toward the rotating member to cause such engagement, and means for returning the guide piece to its normal position after the recording element has been moved a predetermined distance by the pinion.

14. Signal recording mechanism comprising a recording element, a spring-pressed pivoted guide piece for supporting the same, a continuously rotating member, means for normally holding the guide piece against its spring tension, in a position to prevent the engagement of the recording element with the rotating member, tripping means operating to permit the guide piece to move toward the rotating member to cause the engagement of the recording element therewith, and resetting means for the guide piece automatically operated after the recording element has been moved a predetermined distance.

15. Signal recording mechanism comprising a recording element, a movable guide piece for supporting the same, a continuously rotating member, means for moving the guide piece toward the rotating member to cause the engagement of the recording element with the rotating member, and means operated by the recording element, after it has been moved a predetermined distance, for causing it to be disengaged from the rotating member.

16. Signal recording mechanism comprising a recording element provided with rack teeth, a movable guide piece for supporting the recording element, a continuously rotating pinion, means for moving the guide piece toward the pinion, to cause the engagement of the rack teeth of the recording element with the teeth of the said pinion, and means operated by the recording element, after it has been moved a predetermined distance, for returning the guide piece to its normal position and causing the disengagement of the rack teeth of the recording element from the teeth of the pinion.

17. Signal recording mechanism comprising a recording element provided with rack teeth, a movable guide piece for supporting the recording element, a continuously rotating pinion, means for moving the guide piece toward the pinion, to cause the engagement of the rack teeth of the recording element with the teeth of the said pinion, and an abutment carried by the recording element for engagement with the pinion, after the recording element has been moved a predetermined distance, whereby the pinion in its further movement will force the guide piece back to its normal position wherein the rack teeth of the recording element are out of line with the teeth of the pinion.

18. Signal recording mechanism comprising a recording element, a spring-pressed pivoted guide piece for supporting the same, a continuously rotating member a pivoted dog for normally holding the guide piece against its spring tension, in a position to prevent the engagement of the recording element with the rotating member, means for tripping the said dog, and resetting means for the guide piece.

19. Signal recording mechanism comprising a recording element provided with rack teeth, a spring-pressed pivoted guide piece for supporting the recording element, a continuously rotating pinion, a dog for normally holding the guide piece against its spring tension, in a position to prevent engagement of the rack teeth of the recording element with the teeth of the pinion, tripping means controlled by the operation of a signal, for moving the dog to release the guide piece, means for forcing the guide piece backward to release the rack teeth of the recording element from engagement with the teeth of the pinion, after the recording element has been moved a predetermined distance by the pinion, means for returning the recording element to its normal rest position with respect to the said guide piece, and means independent of the said dog for holding the guide piece in its rearward position, during the said return movement of the recording element with respect thereto.

20. Signal recording mechanism comprising a recording element provided with rack teeth, a spring-pressed pivoted guide piece for supporting the recording element, a continuously rotating pinion, a dog for normally holding the guide piece against its spring tension, in a position to prevent the engagement of the rack teeth of the recording element with the teeth of the pinion, tripping means controlled by the operation of a signal, for moving the dog to release the guide piece, means for forcing the guide piece backward to release the rack teeth of the recording element from engagement with the teeth of the pinion, after the recording element has been moved a predetermined distance by the pinion, means for returning the recording element to its normal rest position with respect to the said guide piece, a second dog for holding the guide piece in its rearward position during the return movement of the recording element with respect thereto, and means for tripping the said second dog at the completion of the said return movement of the recording element.

21. Signal recording mechanism comprising a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, means for returning the guide piece to its normal position, thereby causing the disengagement of the recording element from the rotating member, after the recording element has been moved a predetermined distance, and means controlled by the operation of a signal for moving the said recording element into and out of engagement with a record strip.

22. Signal recording mechanism comprising a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, means for returning the guide piece to its normal position, thereby causing the disengagement of the recording element from the rotating member, after the recording element has been moved a predetermined distance, and electro-magnetically controlled operating means.

23. Signal recording mechanism comprising a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, a supporting member for the guide piece, and means controlled by the operation of a signal for moving the supporting member toward and away from a record strip.

24. Signal recording mechanism comprising a recording element, a movable guide piece for supporting the same, a supporting member for the movable guide piece, a continuously rotating member, means for normally holding the guide piece in a position upon its support to prevent the engagement of the recording element with the rotating member, electromagnetically controlled means for tripping the last said means, whereby the recording element will be engaged by the rotating member, and for moving the said supporting member toward a record strip, and resetting means operated after the recording element has been moved by the rotating member through a predetermined distance, to return the guide piece to its normal position upon the supporting element.

25. Signal recording mechanism comprising a recording element, a spring-pressed pivoted guide piece for supporting the same, a continuously rotating member, means for normally holding the guide piece in a position to prevent the engagement of the recording element with the rotating member, a supporting member for the guide piece, an electro-magnet, and an armature therefor having a limited movement with respect to the said supporting member, the said armature being adapted to operate upon the said guide piece holding means, during its limited movement, and to cause the movement of the guide piece therewith during the further movement thereof.

26. Signal recording mechanism comprising a recording element provided with rack teeth, a spring-pressed pivoted guide piece for supporting the same, a continuously rotating pinion, a pivoted plate for supporting the said guide piece, an electro-magnet, an armature therefor carried by the plate and having a limited movement with respect thereto, and means for normally holding the guide piece in a position upon the plate to prevent the engagement of the rack teeth of the recording element with the teeth of the pinion, the said armature being arranged to trip the said means during its limited movement with respect to the pivoted plate carrying it.

27. Signal recording mechanism comprising means for feeding a record strip in one direction, a recording element, a support therefor, a nut and screw in connection with the said support for moving the same in line with the feeding movement of the record strip, means for causing relative movement between the nut and screw to move the supporting member in a direction opposite to the direction of feeding movement of the strip during the continuance of a signal, and means for causing other relative movements between the nut and screw to move the supporting member in the same direction as the feeding movement of the record strip, after the completion of a recording operation, until the recording element has been returned to its normal position.

28. Signal recording mechanism comprising means for feeding a record strip in one direction, a recording element, a support therefor, a nut and screw in connection with the said support, through relative movements of which the said support is moved in line with the feeding movements of the record strip, a friction drive for the said nut and the said screw, whereby the said nut and screw are normally rotated together, and means for holding either the said nut or the said screw against rotative movements whereby the said support is moved in a direction either with or opposite to the direction of movement of the record strip.

29. Signal recording mechanism comprising means for feeding a record strip in one direction, a recording element, a support therefor, a nut and screw in connection with the said support, through relative movements of which the said support is moved in line with the feeding movements of the record strip, ratchets for the said nut and screw, pawls for the said ratchets, a friction drive for the said nut and the said screw whereby the said nut and screw are normally rotated together, and means for controlling the said pawls, whereby the one or the other thereof will be caused to engage the ratchets of the said nut or screw.

30. Signal recording mechanism comprising means for feeding a record strip in one direction, a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, and means for moving the recording element in a direction opposite to the direction of the feeding movement of the strip, during the continuance of a signal, and for thereafter moving the recording element in a direction with the movement of the record strip to return it to a normal position.

31. Signal recording mechanism comprising means for feeding a record strip in one direction, a recording element provided with rack teeth, a movable guide piece for supporting the recording element, a continuously rotating pinion, means for normally holding the guide piece in a position to prevent the engagement of the rack teeth of the recording element with the teeth of the pinion, means for moving the guide piece toward the rotating member to cause such engagement, means for returning the guide piece to its normal position after the recording element has been moved a predetermined distance by the pinion, and means for moving the recording element in a direction opposite to the direction of the feeding movement of the strip, during the continuance of a signal, and for thereafter moving the recording element in a direction with the movement of the record strip to return it to a normal position.

32. Signal recording mechanism comprising means for feeding a record strip in one direction, a recording element, a spring-pressed pivoted guide piece for supporting the same, a continuously rotating member, means for normally holding the guide piece against its spring tension, in a position to prevent the engagement of the recording element with the rotating member, tripping means operating to permit the guide piece to move toward the rotating member to cause the engagement of the recording element therewith, resetting means for the guide piece automatically operated after the recording element has been moved a predetermined distance, and means for moving the recording element in a direction opposite to the direction of the feeding movement of the strip, during the continuance of a signal, and for thereafter moving the recording element in a direction with the movement of the record strip, to return it to a normal position.

33. Signal recording mechanism comprising means for feeding a record strip in one direction, a recording element, a movable guide piece for supporting the same, a continuously rotating member, means for moving the guide piece toward the rotating member to cause the engagement of the recording element with the rotating member, means operated by the recording element, after it has been moved a predetermined distance, for causing it to be disengaged from the rotating member, and means for moving the recording element in a direction opposite to the direction of the feeding movement of the strip, during the continuance of a signal, and for thereafter moving the recording element in a direction with the movement of the record strip, to return it to a normal position.

34. Signal recording mechanism comprising means for feeding a record strip in one direction, a recording element, a movable guide piece for supporting the recording element, a continuously rotating pinion, means for moving the guide piece toward the pinion, to cause the engagement of the rack teeth of the recording element with the teeth of the said pinion, means operated by the recording element, after it has been moved a predetermined distance, for returning the guide piece to its normal position and causing the disengagement of the rack teeth of the recording element from the teeth of the pinion, and means for moving the recording element in a direction opposite to the direction of the feeding movement of the strip, during the continuance of a signal, and for thereafter moving the recording element in a direction with the movement of the record strip, to return it to a normal position.

35. Signal recording mechanism comprising means for feeding a record strip in one direction, a recording element provided with rack teeth, a movable guide piece for supporting the recording element, a continuously rotating pinion, means for moving the guide piece toward the pinion, to cause the engagement of the rack teeth of the recording element with the teeth of the said pinion, an abutment carried by the recording element for engagement with the pinion, after the recording element has been moved a predetermined distance, whereby the pinion in its further movement will force the guide piece back to its normal position wherein the rack teeth of the recording element are out of line with the teeth of the pinion, and means for moving the recording element in a direction opposite to the direction of the feeding movement of the strip, during the continuance of a signal, and for thereafter moving the recording element in a direction with the movement of the record strip, to return it to a normal position.

36. Signal recording mechanism comprising means for feeding a record strip in one direction, a recording element, a spring-pressed pivoted guide piece for supporting the same, a continuously rotating member, a pivoted dog for normally holding the guide piece against its spring tension, in a position to prevent the engagement of the recording element with the rotating member, means for tripping the said dog, resetting means for the guide piece, and means for moving the recording element in a direction opposite to the direction of the feeding movement of the strip, during the continuance of a signal, and for thereafter moving the recording element in a direction with the movement of the record strip, to return it to a normal position.

37. Signal recording mechanism comprising means for feeding a record strip in one direction, a recording element provided with rack teeth, a spring-pressed pivoted guide piece for supporting the recording element, a continuously rotating pinion, a dog for normally holding the guide piece against its spring tension, in a position to prevent engagement of the rack teeth of the recording element with the teeth of the pinion, tripping means controlled by the operation of a signal, for moving the dog to release the guide piece, means for forcing the guide piece backward to release the rack teeth of the recording element from engagement with the teeth of the pinion, after the recording element has been moved a predetermined distance by the pinion, means for returning the recording element to its normal rest position with respect to the said guide piece, means independent of the said dog for holding the guide piece in its rearward position, during the said return movement of the recording element with respect thereto. and means for moving the recording element in a direction opposite to the direction of the feeding movement of the strip, during the continuance of a signal, and for thereafter moving the recording element in a direction with the movement of the record strip, to return it to a normal position.

38. Signal recording mechanism comprising means for feeding a record strip in one direction, a recording element provided with rack teeth, a spring-pressed pivoted guide piece for supporting the recording element, a continuously rotating pinion, a dog for normally holding the guide piece against its spring tension, in a position to prevent the engagement of the rack teeth of the recording element with the teeth of the pinion, tripping means controlled by the operation of a signal, for moving the dog to release the guide piece, means for forcing the guide piece backward to release the rack teeth of the recording element from engagement with the teeth of the pinion after the recording element has been moved a predetermined distance by the pinion, means for returning the recording element to its normal rest position with respect to the said guide piece, a second dog for holding the guide piece in its rearward position, during the return movement of the recording element with respect thereto, means for tripping the said second dog at the completion of the said return movement of the recording element, and means for moving the recording element in a direction opposite to the direction of the feeding movement of the strip, during the continuance of a signal, and for thereafter moving the recording element in a direction with the movement of the record strip, to return it to a normal position.

39. Signal recording mechanism comprising means for feeding a record strip in one direction, a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, means for returning the guide piece to its normal position, thereby causing the disengagement of the recording element from the rotating member, after the recording element has been moved a predetermined distance, means controlled by the operation of a signal for moving the said recording element into and out of engagement with a record strip, and means for moving the recording element in a direction opposite to the direction of the feeding movement of the strip, during the continuance of a signal, and for thereafter moving the recording element in a direction with the movement of the record strip, to return it to a normal position.

40. Signal recording mechanism comprising means for feeding a record strip in one direction, a recording element, a movable guide piece for supporting the same, a continuously rotating member, means for normally holding the guide piece in a position to prevent the engagement of the recording element with the rotating member, means for moving the guide piece toward the rotating member to cause the engagement of the rotating member with the recording element, whereby the said recording element will be moved laterally by the said rotating member, means for returning the guide piece to its normal position, thereby causing the disengagement of the recording element from the rotating member, after the recording element has been moved a predetermined distance, electro-magnetically controlled operating means, and means for moving the recording element in a direction opposite to the direction of the feeding movement of the strip, during the continuance of a signal, and for thereafter moving the recording element in a direction with the movement of the record strip, to return it to a normal position.

41. Signal recording mechanism comprising means for feeding a record strip in one direction, a recording element, means for moving the recording element toward and away from the record strip, means for moving the recording element in the line of movement of the record strip, and means for moving the recording element transversely across the face of the record strip.

THEODORE M. FOOTE.

Witnesses:
E. EDNA SPRY,
THOMAS B. BOOTH.